United States Patent [19]

Xolin et al.

[11] Patent Number: 5,492,358
[45] Date of Patent: Feb. 20, 1996

[54] METHOD FOR MANUFACTURING AN ITEM OF EQUIPMENT, PARTICULARLY FOR A MOTOR VEHICLE, AND ITEM OBTAINED ACCORDING TO THE METHOD

[75] Inventors: Frédéric Xolin, Audincourt; Bernard Goisset, Blamont, both of France

[73] Assignee: ECIA-Equipments et Composants pour l'Industrie Automobile, France

[21] Appl. No.: 346,196

[22] Filed: Nov. 22, 1994

[30] Foreign Application Priority Data

Nov. 25, 1993 [FR] France .................. 93 14121

[51] Int. Cl.⁶ ........................................... B60R 21/16
[52] U.S. Cl. ........................... 280/728.1; 280/728.2
[58] Field of Search ................. 280/728 B, 731, 280/732, 728 R, 743 R

[56] References Cited

U.S. PATENT DOCUMENTS

| | | | |
|---|---|---|---|
| 5,215,330 | 6/1993 | Kurita | 280/728 R |
| 5,217,250 | 6/1993 | Sakata | 280/731 X |
| 5,217,254 | 6/1993 | Satoh | 280/732 |
| 5,288,103 | 2/1994 | Parker et al. | 280/728 B |
| 5,340,149 | 8/1994 | Gajewski | 280/732 |
| 5,342,086 | 8/1994 | Harris et al. | 280/728 B |
| 5,372,379 | 12/1994 | Parker | 280/728 B |
| 5,382,047 | 1/1995 | Gajewski | 280/728 B |

FOREIGN PATENT DOCUMENTS

| | | |
|---|---|---|
| 3116538 | 11/1982 | Germany . |
| 3545028 | 7/1987 | Germany . |
| 2241663 | 9/1991 | United Kingdom . |
| 2244449 | 12/1991 | United Kingdom . |
| 2269789 | 2/1994 | United Kingdom ........ 280/728 B |

*Primary Examiner*—Karin L. Tyson
*Assistant Examiner*—Christopher Ellis
*Attorney, Agent, or Firm*—Sughrue, Mion, Zinn, Macpeak & Seas

[57] ABSTRACT

A method for manufacturing a steering wheel central pad having a skeleton (1) provided with an open dish (2), for receiving an inflatable bag in a folded state, and with a soft covering (5). At least the inflatable bag (3) in the folded state is placed in the dish. The opening of the dish (2) is closed off using a sealing material (4) which can tear when the bag inflates. The skeleton, together with its dish (2) provided with the bag (3) and with the sealing material (4), is placed in a mold for manufacturing the soft covering by injection of plastic. Then, plastic is injected into the mold in order to form the soft covering (5).

3 Claims, 1 Drawing Sheet

METHOD FOR MANUFACTURING AN ITEM OF EQUIPMENT, PARTICULARLY FOR A MOTOR VEHICLE, AND ITEM OBTAINED ACCORDING TO THE METHOD

BACKGROUND OF THE INVENTION

The present invention relates to a method for manufacturing an item of equipment, particularly for a motor vehicle, and to an item of equipment obtained according to this method.

More particularly, the invention relates to methods for manufacturing motor vehicle items of equipment which comprise at least one inflatable bag such as, for example, items of equipment located in the region of the dashboards of vehicles or in the region of the steering wheels of the latter.

The methods for manufacturing this type of items of equipment which are known in the state of the art essentially consist in fitting the item of equipment to the vehicle, placing the inflatable bag in a dish in the skeleton of this item, then fixing to this skeleton a soft covering which has been made independently of the rest of the item.

This is the case, for example with the central pads of vehicle steering wheels in which the various assembly operations are performed at the vehicle manufacturers'.

It can be understood that these various assembly operations require the various elements of this item to be assembled one after another and that these operations exhibit a certain number of drawbacks, particularly as regards the time required for this assembly and the presence of fastening members such as rivets or the like for fixing these elements to the rest of the skeleton of the item.

SUMMARY OF THE INVENTION

The object of the invention is therefore to solve these problems.

To this end, the subject of the invention is a method for manufacturing an item of equipment, particularly for a motor vehicle, comprising a skeleton provided with an open dish for receiving an inflatable bag in the folded state, and with a soft covering, characterized in that it includes the following steps:

- at least the inflatable bag in the folded state is placed in the dish;
- the opening of the dish is closed off using a sealing material which can tear when the bag inflates;
- the skeleton together with its dish provided with the bag and with the sealing material is placed in a mould for manufacturing the soft covering by injection of plastic; and
- plastic is injected into the mould in order to form the soft covering.

According to another aspect, another subject of the invention is an item of motor vehicle equipment obtained according to this method.

The invention will be better understood upon reading the description which follows, given solely by way of example and made with reference to the appended drawings, in which:

As can be seen in these figures, an item of motor vehicle equipment includes an item skeleton intended to receive at least one inflatable bag in an open dish for receiving this bag in the folded state, and may be designed to form, for example, a central pad of a steering wheel of a vehicle or even an item of equipment intended to be incorporated into the dashboard of the vehicle, for example facing the front-seat passenger of the latter.

Figure 1:
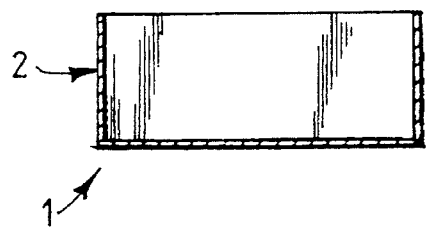
FIG. 1 is an illustration of a skeleton of the item of equipment.
Figure 2:
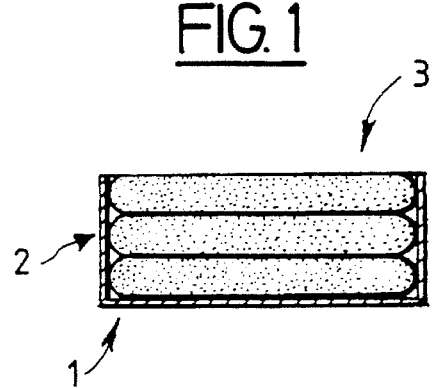
FIG. 2 illustrates the first step of the method of manufacturing the item of equipment.

The skeleton of this item of equipment, denoted generally by the reference 1 in FIG. 1, includes an open dish 2 for receiving the inflatable bag in the folded state, and according to the method according to the invention, as illustrated in these FIGS. 1 to 4, the first step of this method consists in placing at least the inflatable bag, denoted by the general reference 3 in FIG. 2, in the dish 2 of the skeleton 1.

It will be noted, as far as this is concerned, that a gas generator may equally well be placed in this dish, in the conventional way, this gas generator being connected to the rest of the control/operating circuits of the vehicle by means, for example, of electrical connection means.

However, it is known in the state of the art that the gas generator may equally well be placed in some other member of the vehicle, such as the steering column shaft for example in the case where the item of equipment is a steering wheel central pad or alternatively in a strengthening beam of the dashboard in the case where the item of equipment is placed in the dashboard of the vehicle facing the front-seat passenger.

Figure 3:
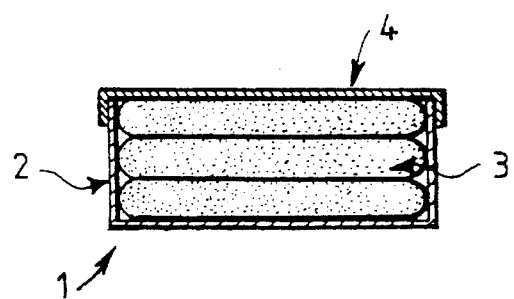
FIG. 3 illustrates a second step of the method.

Once this inflatable bag and possibly the gas generator have been placed in the dish 2, the opening of this dish is closed off with the aid of a sealing material which can be torn when the bag inflates, as is illustrated in FIG. 3.

This sealing material may, for example, be in the form of a film 4 stretched over the opening in the dish 2 above the inflatable bag 3.

The peripheral edge of this film is fixed to the corresponding edges of the dish by any appropriate means such as, for example, through the use of an elastic or some other clip.

Figure 4:
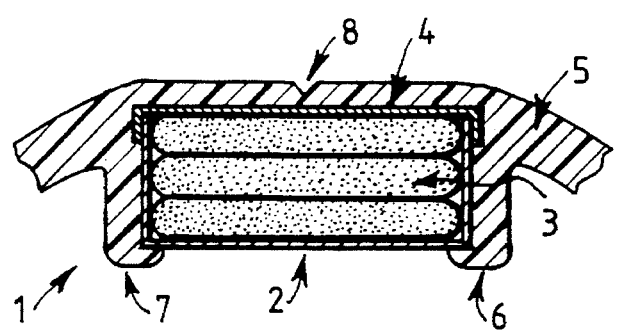
FIG. 4 illustrates a third step of the method.

Next, the item skeleton together with its dish provided with the inflatable bag 3 and with the sealing film 4 is placed in a mould for manufacturing the soft covering of the item of equipment by injection of plastic into the mould in order to form the soft covering denoted by the general reference 5 in FIG. 4.

The manufacturing mould may be designed so as to form tabs 6 and 7 for fastening the soft covering onto the skeleton 2 in order to obtain a good connection between the soft covering and the latter.

Of course, the mould may equally well be designed to form preferential breakage zones 8 for this soft covering, facing the opening of the dish, these zones tearing when the bag inflates, as is conventional.

It is therefore understood that this manufacturing method makes it possible to obtain an item of equipment provided with a plastic soft covering which may be fixed directly to another member of the vehicle and which is delivered to the vehicle manufacturers in the assembled state, which makes it possible to solve the previously-mentioned assembly problems.

What is claimed:

1. A method for manufacturing an item of equipment for a motor vehicle, said item comprising a skeleton (1) provided with an open dish (2), for receiving an inflatable bag (3) in a folded state, and with a soft covering (5), said method comprising the following steps:

- placing at least the inflatable bag (3) in the folded state in the dish (2);
- closing off the opening of the dish (2) with a sealed material (4) which can tear when the bag inflates;
- placing the skeleton, together with its dish (2) provided with the bag (3) and with the sealing material (4), in a mould for manufacturing the soft covering by injection of plastic; and
- injecting the plastic into the mould in order to form the soft covering (5).

2. The method according to claim 1, wherein the opening of the dish is closed off with a film (4) of the sealing material.

3. An item of motor vehicle equipment obtained according to the method of claim 1.

* * * * *